United States Patent
Dabbiere et al.

(10) Patent No.: US 11,824,859 B2
(45) Date of Patent: *Nov. 21, 2023

(54) CERTIFICATE BASED PROFILE CONFIRMATION

(71) Applicant: AirWatch LLC, Atlanta, GA (US)

(72) Inventors: Alan Dabbiere, McLean, VA (US); Erich Stuntebeck, Marietta, GA (US)

(73) Assignee: AirWatch LLC, Atlanta, GA (US)

( * ) Notice: Subject to any disclaimer, the term of this patent is extended or adjusted under 35 U.S.C. 154(b) by 316 days.

This patent is subject to a terminal disclaimer.

(21) Appl. No.: 17/206,269

(22) Filed: Mar. 19, 2021

(65) Prior Publication Data

US 2021/0211429 A1 Jul. 8, 2021

Related U.S. Application Data

(63) Continuation of application No. 16/749,937, filed on Jan. 22, 2020, now Pat. No. 10,972,467, which is a (Continued)

(51) Int. Cl.
*H04L 9/40* (2022.01)
*G06F 21/30* (2013.01)
(Continued)

(52) U.S. Cl.
CPC .............. *H04L 63/10* (2013.01); *G06F 21/30* (2013.01); *G06F 21/33* (2013.01); *G06F 21/335* (2013.01);
(Continued)

(58) Field of Classification Search
CPC ........ G06F 21/30; G06F 21/33; G06F 21/335; G06F 21/44; G06F 21/50; G06F 21/51;
(Continued)

(56) References Cited

U.S. PATENT DOCUMENTS

| 5,574,786 A | 11/1996 | Dayan |
| 5,987,609 A | 11/1999 | Hasebe |

(Continued)

FOREIGN PATENT DOCUMENTS

| CA | 2149337 A1 | 6/1994 |
| EP | 1276035 A2 | 1/2003 |

(Continued)

OTHER PUBLICATIONS

US 8,061,944 B2, 11/2011, Quinlan (withdrawn)

(Continued)

*Primary Examiner* — Samson B Lemma
(74) *Attorney, Agent, or Firm* — Clayton, Mckay & Bailey, PC

(57) ABSTRACT

Disclosed are various embodiments for controlling access to resources in a network environment. Methods may include installing a profile on the device and installing a certificate included in or otherwise associated with the profile on the device. A request to execute an application, and/or access a resource using a particular application, is received and determination is made as to whether the certificate is installed on the device based on an identification of the certificate by the application. If the certificate is installed on the device, then execution of the application and/or access to the resource is allowed. If the certificate is not installed on the device, then the request for execution and/or access is refused.

20 Claims, 3 Drawing Sheets

Related U.S. Application Data continuation of application No. 15/800,224, filed on Nov. 1, 2017, now Pat. No. 10,560,453, which is a continuation of application No. 13/835,542, filed on Mar. 15, 2013, now Pat. No. 9,819,682.

(51) Int. Cl.

| | | |
|---|---|---|
| *G06F 21/33* | (2013.01) | |
| *G06F 21/44* | (2013.01) | |
| *G06F 21/50* | (2013.01) | |
| *G06F 21/51* | (2013.01) | |
| *G06F 21/54* | (2013.01) | |
| *H04W 12/08* | (2021.01) | |
| *H04W 12/37* | (2021.01) | |

(52) U.S. Cl.
CPC .............. *G06F 21/44* (2013.01); *G06F 21/50* (2013.01); *G06F 21/51* (2013.01); *G06F 21/54* (2013.01); *H04W 12/08* (2013.01); *H04W 12/37* (2021.01)

(58) Field of Classification Search
CPC .... G06F 21/54; H04L 63/10; H04W 12/0027; H04W 12/08
USPC .............................................. 726/3; 713/168
See application file for complete search history.

(56) References Cited

U.S. PATENT DOCUMENTS

| | | | |
|---|---|---|---|
| 6,021,492 A | 2/2000 | May | |
| 6,023,708 A | 2/2000 | Mendez | |
| 6,085,192 A | 7/2000 | Mendez | |
| 6,131,096 A | 10/2000 | Ng | |
| 6,131,116 A | 10/2000 | Riggins | |
| 6,151,606 A | 11/2000 | Mendez | |
| 6,233,341 B1 | 5/2001 | Riggins | |
| 6,560,772 B1 | 5/2003 | Slinger | |
| 6,708,221 B1 | 3/2004 | Mendez | |
| 6,714,859 B2 | 3/2004 | Jones | |
| 6,726,106 B1 | 4/2004 | Han | |
| 6,727,856 B1 | 4/2004 | Hill | |
| 6,741,232 B1 | 5/2004 | Siedlikowski | |
| 6,741,927 B2 | 5/2004 | Jones | |
| 6,766,454 B1 | 7/2004 | Riggins | |
| 6,779,118 B1 | 8/2004 | Ikudome | |
| 6,904,359 B2 | 6/2005 | Jones | |
| 6,965,876 B2 | 11/2005 | Dabbiere | |
| 6,995,749 B2 | 2/2006 | Friend | |
| 7,032,181 B1 | 4/2006 | Farcasiu | |
| 7,039,394 B2 | 5/2006 | Bhaskaran | |
| 7,039,679 B2 | 5/2006 | Mendez | |
| 7,064,688 B2 | 6/2006 | Collins | |
| 7,092,943 B2 | 8/2006 | Roese | |
| 7,184,801 B2 | 2/2007 | Farcasiu | |
| 7,191,058 B2 | 3/2007 | Laird | |
| 7,203,959 B2 | 4/2007 | Nachenberg | |
| 7,225,231 B2 | 5/2007 | Mendez | |
| 7,228,383 B2 | 6/2007 | Friedman | |
| 7,275,073 B2 | 9/2007 | Ganji | |
| 7,284,045 B1 | 10/2007 | Marl | |
| 7,287,271 B1 | 10/2007 | Riggins | |
| 7,308,703 B2 | 12/2007 | Wright | |
| 7,310,535 B1 | 12/2007 | Mackenzie | |
| 7,353,533 B2 | 4/2008 | Wright | |
| 7,363,349 B2 | 4/2008 | Friedman | |
| 7,363,361 B2 | 4/2008 | Tewari | |
| 7,373,517 B1 | 5/2008 | Riggins | |
| 7,437,752 B2 | 10/2008 | Heard | |
| 7,444,375 B2 | 10/2008 | McConnell | |
| 7,447,506 B1 | 11/2008 | Mackenzie | |
| 7,447,799 B2 | 11/2008 | Kushner | |
| 7,475,152 B2 | 1/2009 | Chan | |
| 7,539,665 B2 | 5/2009 | Mendez | |
| 7,496,957 B2 | 7/2009 | Howard | |
| 7,565,314 B2 | 7/2009 | Borgeson | |
| 7,590,403 B1 | 9/2009 | House | |
| 7,594,224 B2 | 9/2009 | Patrick | |
| 7,603,547 B2 | 10/2009 | Patrick | |
| 7,603,548 B2 | 10/2009 | Patrick | |
| 7,603,703 B2 | 10/2009 | Craft | |
| 7,617,222 B2 | 11/2009 | Coulthard | |
| 7,620,001 B2 | 11/2009 | Ganji | |
| 7,620,392 B1 | 11/2009 | Maurya | |
| 7,650,491 B2 | 1/2010 | Craft | |
| 7,660,902 B2 | 2/2010 | Graham | |
| 7,665,118 B2 | 2/2010 | Mann | |
| 7,665,125 B2 | 2/2010 | Heard | |
| 7,685,645 B2 | 3/2010 | Doyle | |
| 7,702,322 B1 | 4/2010 | Maurya | |
| 7,702,785 B2 | 4/2010 | Bruton | |
| 7,735,122 B1 | 6/2010 | Johnson | |
| 7,739,334 B1 | 6/2010 | Ng | |
| 7,752,166 B2 | 7/2010 | Quinian | |
| 7,788,382 B1 | 8/2010 | Jones | |
| 7,792,297 B1 | 9/2010 | Piccionelli | |
| 7,840,631 B2 | 11/2010 | Farcasiu | |
| 7,890,091 B2 | 2/2011 | Puskoor | |
| 7,900,048 B2* | 3/2011 | Andersson | G06F 21/51 |
| | | | 705/51 |
| 7,912,896 B2 | 3/2011 | Wolovitz | |
| 7,917,641 B2 | 3/2011 | Crampton | |
| 7,970,386 B2 | 6/2011 | Bhat | |
| 8,001,082 B1 | 8/2011 | Muratov | |
| 8,012,219 B2 | 9/2011 | Mendez | |
| 8,037,317 B2* | 10/2011 | Kusudo | H04N 21/235 |
| | | | 455/411 |
| 8,041,776 B2 | 10/2011 | Friedman | |
| 8,046,823 B1 | 10/2011 | Begen | |
| 8,060,074 B2 | 11/2011 | Danford | |
| 8,078,157 B2 | 12/2011 | Maurya | |
| 8,094,591 B1 | 1/2012 | Hunter | |
| 8,117,344 B2 | 2/2012 | Mendez | |
| 8,150,431 B2 | 4/2012 | Wolovitz | |
| 8,225,381 B2 | 7/2012 | Lemke | |
| 8,473,743 B2* | 6/2013 | Freedman | H04L 63/02 |
| | | | 713/168 |
| 8,494,485 B1 | 7/2013 | Broch | |
| 8,650,620 B2* | 2/2014 | Chawla | G06F 21/51 |
| | | | 726/21 |
| 9,172,699 B1 | 10/2015 | Vazquez | |
| 2002/0013721 A1 | 1/2002 | Dabbiere | |
| 2003/0110084 A1 | 6/2003 | Eberhard | |
| 2003/0204716 A1 | 10/2003 | Rockwood | |
| 2004/0123153 A1 | 6/2004 | Wright | |
| 2004/0177249 A1* | 9/2004 | Keohane | G06F 21/33 |
| | | | 713/156 |
| 2004/0181687 A1 | 9/2004 | Nachenberg | |
| 2004/0224703 A1 | 11/2004 | Takaki | |
| 2005/0246192 A1 | 11/2005 | Jauffred | |
| 2006/0106836 A1 | 5/2006 | Masugi | |
| 2006/0190984 A1 | 8/2006 | Heard | |
| 2007/0033397 A1 | 2/2007 | Phillips | |
| 2007/0106899 A1 | 5/2007 | Suzuki | |
| 2007/0136492 A1 | 6/2007 | Blum | |
| 2007/0143851 A1* | 6/2007 | Nicodemus | H04L 63/1433 |
| | | | 726/4 |
| 2007/0156897 A1 | 7/2007 | Lim | |
| 2007/0174433 A1 | 7/2007 | Mendez | |
| 2007/0261099 A1 | 11/2007 | Broussard | |
| 2007/0288637 A1 | 12/2007 | Layton | |
| 2008/0005426 A1* | 1/2008 | Bacastow | G06F 21/78 |
| | | | 710/62 |
| 2008/0133712 A1 | 6/2008 | Friedman | |
| 2008/0134305 A1 | 6/2008 | Hinton | |
| 2008/0134347 A1 | 6/2008 | Goyal | |
| 2008/0201453 A1 | 8/2008 | Assenmacher | |
| 2009/0036111 A1 | 2/2009 | Danford | |
| 2009/0144632 A1 | 6/2009 | Mendez | |
| 2009/0198997 A1 | 8/2009 | Yeap | |
| 2009/0260064 A1 | 10/2009 | McDowell | |
| 2009/0300739 A1 | 12/2009 | Nice | |
| 2009/0307362 A1 | 12/2009 | Mendez | |

(56) References Cited

U.S. PATENT DOCUMENTS

| | | |
|---|---|---|
| 2010/0005125 A1 | 1/2010 | Mendez |
| 2010/0005157 A1 | 1/2010 | Mendez |
| 2010/0005195 A1 | 1/2010 | Mendez |
| 2010/0023630 A1 | 1/2010 | Mendez |
| 2010/0100641 A1 | 4/2010 | Quinian |
| 2010/0120450 A1 | 5/2010 | Herz |
| 2010/0144323 A1 | 6/2010 | Collins |
| 2010/0146269 A1 | 6/2010 | Baskaran |
| 2010/0254410 A1 | 10/2010 | Collins |
| 2010/0268844 A1 | 10/2010 | Quinian |
| 2010/0273456 A1 | 10/2010 | Wolovitz |
| 2010/0299152 A1 | 11/2010 | Batchu |
| 2010/0299362 A1 | 11/2010 | Osmond |
| 2010/0299376 A1 | 11/2010 | Batchu |
| 2010/0299719 A1 | 11/2010 | Burks |
| 2011/0004941 A1 | 1/2011 | Mendez |
| 2011/0082900 A1 | 4/2011 | Nagpal |
| 2011/0113062 A1 | 5/2011 | Quinian |
| 2011/0145932 A1 | 6/2011 | Nerger |
| 2011/0153779 A1 | 6/2011 | Mendez |
| 2011/0153799 A1 | 6/2011 | Ito |
| 2011/0153803 A1* | 6/2011 | Kuo .................. H04L 67/303 709/224 |
| 2011/0167474 A1 | 7/2011 | Sinha |
| 2011/0202589 A1 | 8/2011 | Piernot |
| 2011/0225252 A1 | 9/2011 | Bhat |
| 2011/0252240 A1* | 10/2011 | Freedman ............ H04W 12/08 713/169 |
| 2011/0270799 A1 | 11/2011 | Muratov |
| 2011/0276805 A1 | 11/2011 | Nagpal |
| 2011/0296186 A1 | 12/2011 | Wong |
| 2011/0320552 A1 | 12/2011 | Friedman |
| 2012/0005578 A1 | 1/2012 | Hawkins |
| 2012/0015644 A1 | 1/2012 | Danford |
| 2012/0102392 A1 | 4/2012 | Reesman |
| 2012/0159578 A1* | 6/2012 | Chawla ................. G06F 21/53 726/4 |
| 2012/0198547 A1 | 8/2012 | Fredette |
| 2013/0061307 A1 | 3/2013 | Livne |
| 2013/0152169 A1 | 6/2013 | Stuntebeck |
| 2014/0162614 A1 | 6/2014 | Lindeman |
| 2014/0282916 A1 | 9/2014 | Gast |
| 2015/0237498 A1 | 8/2015 | Freedman |

FOREIGN PATENT DOCUMENTS

| | | |
|---|---|---|
| GB | 2346716 B | 8/2000 |
| WO | WO200241661 | 5/2002 |
| WO | WO2003096238 | 11/2003 |

OTHER PUBLICATIONS

"Asynchrony Software, Inc.," "PDA Defense User "Guide", 2002, p. 726.

"Download Over the Air Specification", no. Candidate Version 2.0, Sep. 7, 2006, 1-88.

"Download Over the Air Specification", OMA-TS-DLOTA-V2 0-20060907-C, Open Mobile Alliance Ltd, no Candidate Version 2.0 Sep. 7, 2006, Sep. 7, 2006, pp. 1-88.

"Examination Report dated Mar. 20, 2017 for Patent No. 14716157. 4-1853".

"International Search Report for PCT/2014/025306 dated Sep. 4, 2014".

"Patent Examination Report dated Jun. 20, 2016 for Application No. 2014235181".

Armando, Fox , et al., "Security on the Move: Indirect Authentication Using Kerberos", 1996, p. 726.

Belani, Eshwar , et al., "The CRISIS Wide Area Security Architecture", 1998, p. 726.

Benaloh, Josh , et al., "Patient Controlled Encryption: Ensuring Privacy of Electronic Medical Records", Nov. 13, 2009, p. 726.

Menaria, Pankaj , et al., "Security in Mobile Database Systems", Mar. 17, 2011, pp. 707, 726.

Pfitzman, Andreas , et al., "Mobile User Devices and Security Modules: Design for Trustworthiness", Feb. 5, 1996, p. 726.

Shrunk, John , et al., "Self-Securing Storage: Protecting Data in Compromised Systems", Symposium On Operating Systems Design and Implementation, 2000, p. 726.

Steiner, Jennifr , "Kerberos:An Authentication Service for Open Network Systems", Jan. 12, 1988, p. 726.

\* cited by examiner

CERTIFICATE BASED PROFILE CONFIRMATION

This application claims priority as a continuation of U.S. patent application Ser. No. 16/749,937, entitled "CERTIFICATE BASED PROFILE CONFIRMATION" and filed Jan. 22, 2020, which claims priority as a continuation of U.S. patent application Ser. No. 15/800,224, entitled "CERTIFICATE BASED PROFILE CONFIRMATION" and filed Nov. 1, 2017, which claims priority as a continuation of U.S. patent application Ser. No. 13/835,542, entitled "CERTIFICATE BASED PROFILE CONFIRMATION" and filed Mar. 15, 2013, all of which are herein incorporated by reference in their respective entireties for all purposes.

BACKGROUND

Controlling access to enterprise resources by network-connected devices is critical to ensure that only authenticated and authorized users and devices gain access to sensitive information or services. To date, this has typically been accomplished by utilizing network firewalls, reverse proxy servers with authentication, and encrypted VPN tunnels Today, however, enterprise resources are being moved out of enterprise managed data centers and into the "Cloud."

The inventors have explored various ways of protecting enterprise-managed data centers at a device level. These solutions have addressed challenges related to, for example, the fact that cloud-based data services often do not provide the necessary features to allow enterprises to control access to the service at a device level, but rather permit access, without restriction as to any device, with proper user level access controls.

Controlling access to and distribution of enterprise resources, such as documents, databases, and executable applications, in a networked environment is critical to ensure that only authorized users and network-connected devices may gain access to sensitive information. Depending on the sensitivity of a given resource, an array of authorization rues may be necessary to ensure that the resource is adequately protected. Some resources may only require ensuring that the proper user is requesting the resource. Other resources may require compliance with more stringent authorization rues, such as determining whether an appropriate transport protocol is used (i.e., http and/or https) by the requesting device, determining whether access to the resource is permitted for a specified duration or at a given time, determining whether the resource is accessed from a secured device, etc.

However, in many such systems, it is necessary for the managing system to have significant control over the managed device in order to implement the desired protocols. This may present its own challenges in situations where, for example, all device users are not willing to surrender the necessary level of device control, and/or where enterprise managers may desire to allow users of non-managed devices certain limited access to resources on the managed network, such as data, etc. Accordingly, the inventors have proposed the following systems and methods to provide, at least in some aspects, methods of enforcing protocols on devices that are not otherwise under management of a Mobile Device Management (MDM) service.

SUMMARY OF THE INVENTION

The following systems and methods provide solutions for controlling the use and distribution of resources in a networked environment, including limiting application execution and/or distribution of resources to devices that are not fully managed by an MDM service, Among other objects, the present subject matter may provide the ability to uniquely associate a required profile with a certificate, and to check that the certificate is installed on the mobile device to thereby ensure the required profile is also still in place.

In cases where a mobile device is not fully managed by an MDM service, the MDM, or other service, may instead provide the user of the device with a required profile for use with an enterprise application or an application that is configured to access enterprise resources including remotely stored data. The required profile may specify certain mandated settings, or parameters, for the device, and include a certificate that is uniquely associated with the required profile. The term "required" is used herein to signify that the profile is defined by or for the operator of the MDM service and must be installed on a device and validated before the device will be permitted to execute a certain application or access certain enterprise resources and/or access the managed network. When the device requests to execute the associated application or to access certain data or other resources from the managed network, the presence of the required profile on the device may be confirmed, as well as the compliance of the device with one or more setting or parameters specified in the required profile, by confirming that the certificate is installed on the device and/or that the stored certificate is valid.

According to certain embodiments, methods of managing access to resources by a device may include one or more steps of installing a plurality of profiles on the device; installing a plurality of certificates associated with the profiles; receiving a plurality of requests to access a plurality of resources; and/or determining whether the certificates are accessible to the device.

In some embodiments, determining whether the certificates are accessible to the device may include determining whether the certificates are stored and/or installed on the device. In some embodiments, determining whether the certificates are installed on the device may be based on an identification of the certificates by the applications.

In some embodiments, if it is determined that certain of the certificates are accessible to the device, and/or are installed on the device, then resources associated with the certain certificates may be accessed. Whereas, if it is determined that certain certificates are not accessible to the device, and/or are not installed on the device, then the requests to access the resources associated with the certain certificates may be refused.

In some embodiments, a request to access a resource may include one or more of a request to execute an application on the device, a request to access or render data stored on the device, a request to execute an enterprise application residing at least partially on a network, and/or a request to access or render data that is stored at least partially on a network. In embodiments where the request to access the resource includes a request to execute an application, the application may be referred to as the "called application."

It should be noted that, as used herein, certain portions of a resource may be executed and/or accessed, in a limited manner, in order to perform the certificate validation without fully executing or accessing the resource as requested by the user. For example, in the context of requesting an application to execute, certain portions of the application may execute for the purpose of identifying and/or validating the required profile or corresponding certificate, but the application may not fully "open" for the user until the certificate validation is successfully completed. Likewise, in the context of requesting access to certain local or network data, portions of the requested data, or other associated data, may be accessed for purposes of identifying and/or validating the required profile or corresponding certificate, but the requested data may not be fully "accessed" by the user until the certificate validation is successfully completed.

In some embodiments, the profiles or certificates may be uniquely associated with the called application, the profiles or certificates may be associated with particular data, and/or certain certificates may be uniquely associated with certain profiles.

In some embodiments, various functions of the device may be enabled and/or disabled to bring the device into compliance with one or more settings and/or parameters specified in the required profile. For example, a parameter may specify that the data not be transferred outside of the device, hi such a case, a camera, screen capture function, transmission capability, or other function of the device that would facilitate the transfer of data outside of the device, may be disabled via appropriate settings included in the profile.

In some embodiments, a request to access a resource on a remote server may be sent by the application if a required certificate is determined to be installed on the device.

In some embodiments, a failure notification may be sent to a remote server if a required certificate is determined not to be installed on the device.

In some embodiments, the determination as to whether a required certificate is installed on the device may be performed in response to a request to access the resource, prior to receiving the request to access the resource, at scheduled or random times (regardless the request to access the resource), and/or based on detection of a non-complying setting or parameter.

An alert may be sent from the device to a managing server if either the profile or certificate is not present on the device, or if the device is not in compliance with the at least one setting or parameter of the required profile. In response to such an alert, the server may initiate a remedial action, such as, enabling or disabling hardware and/or software functionality, increasing a password complexity, sending a message to an account and/or service administrator, sending a message to a user, locking the device, an enterprise wipe of certain resources, a full or partial wipe of the device, removing profiles, disabling access to enterprise server resources such as email, application data, content servers such as SharePoint, Box, etc., disabling and/or removing applications, etc. In some embodiments, the enabled or disabled functionality may include at least one of a camera, a screen capture, an artificial intelligence and/or assistance program (e.g. Apple Siri, Google Now, and the like), a GPS, Wifi communication, cellular communication, a microphone, speakers, a touchscreen, network support and/or services (e.g. Apple iCloud, Microsoft SkyDrive and the like), etc. In some embodiments, a sever may independently enforce various of the foregoing functions, and/or may "push" necessary enforcement commands, code, and the like, to devices, or other service providers. In some embodiments, the device may include local rules that allow enforcement of the remedial action, such as in the case of functionality bunt into an OS, e.g. password enforcement, etc., and/or when the device includes certain enterprise applications, such as a Secure Content Locker described further herein.

In some embodiments, the profiles may be, for example, one of a plurality of iOS profiles, a plurality of Android OS profiles, a plurality of Windows Mobile profiles, a plurality of Windows Phone profiles, a plurality of Windows 8 (etc.) profiles, a plurality of Mac OS X (etc.) profiles, a plurality of Symbian OS profiles, or other operating system profiles. In some embodiments, the certificates may be one of a plurality of root certificates and/or a plurality of intermediate certificates, and may be stored, if at all, in a "trust store" or "certificate store" of the device or in some other suitable memory space of the device.

In some embodiments, required certificates may be securely associated with certain devices and stored remotely from the devices. In such embodiments, device profile compliance may be determined, for example, by checking those certificates in addition to, or instead of, checking locally stored certificates.

According to certain further embodiments, a method of managing an application on a device, based on the presence of a plurality of profiles on the device, may include one or more steps of receiving a plurality of requests to execute a plurality of applications on the device; identifying a plurality of certificates associated with the profiles and the applications; and/or determining whether the certificates are installed on the device. In some embodiments, if certain of the certificates are installed on the device, then applications associated with the certain certificates may be executed, whereas if certain certificates are not installed on the device, then requests to execute applications associated with the certain certificates may be refused.

According to certain further embodiments, an apparatus including a computing device, a display and a processor may be configured to perform the various method steps and functions described herein.

According to certain further embodiments, the various method steps and apparatus functions described herein may be embodied on non-transitory electronic storage medium in the form of computer-readable instructions that, when executed by a microprocessor, cause a computer system perform the described functions and steps.

Additional features, advantages, and embodiments may be set forth or apparent from consideration of the following detailed description, drawings, and claims. Moreover, it is to be understood that both the foregoing summary and the following detailed description are provided by way of example only and intended to provide further explanation without limiting the scope of the claimed subject matter.

BRIEF DESCRIPTION OF THE DRAWINGS

Many aspects of the present disclosure can be better understood with reference to the following diagrams. The drawings are not necessarily to scale, emphasis instead being placed upon clearly illustrating certain features of the disclosure. Moreover, in the drawings, like reference numerals designate corresponding parts throughout the several views.

DETAILED DESCRIPTION

Figure 1:
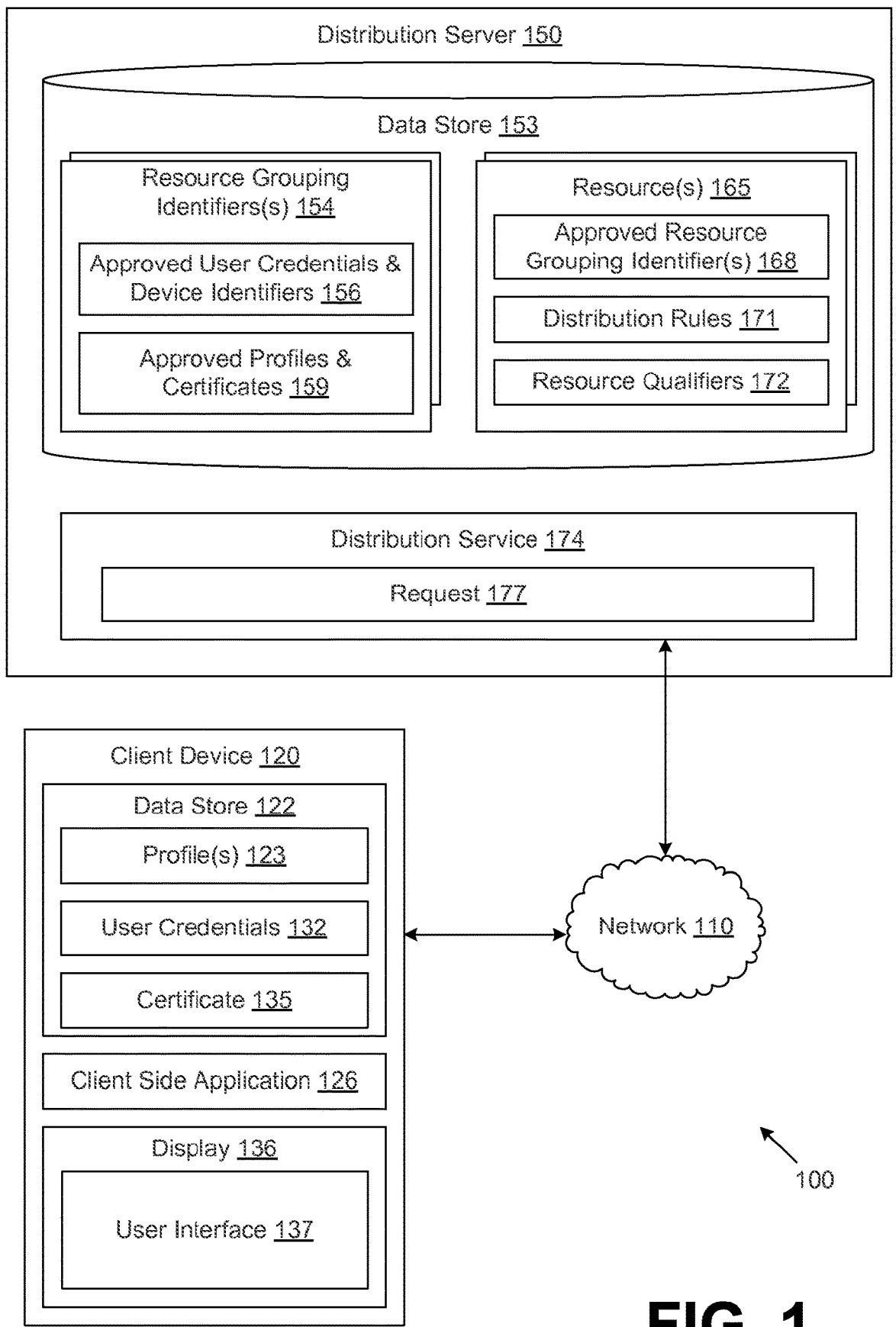
FIG. 1 is a block diagram of a networked environment according to certain exemplary embodiments of the present invention.

It is to be understood that the invention is not limited to the particular methodology, protocols, etc. described herein, as the skilled artisan will recognize that these may vary in different embodiments the invention. It is also to be understood that the terminology used herein is used for the purpose of describing particular embodiments only, and is not intended to limit the scope of the invention. It also is to be noted that as used herein and in the appended claims, the singular forms "a," and "the" include the plural reference unless the context clearly dictates otherwise. Thus, for example, a reference to "a server" is a reference to one or more servers and equivalents thereof known to those skilled in the art.

The embodiments of the invention and the various features and advantageous details thereof are explained more fully with reference to the non-limiting embodiments and examples that are described and/or illustrated in the accompanying drawings and detailed in the following description, Descriptions of well-known components and computing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended cairns and applicable law.

As used herein, a "profile" should be understood as referring to a file that is recognizable by the operating system (OS) of a user device, and that defines one or more settings. As used herein, such settings may also include more general "parameters" that may relate to, for example, the presence or absence of certain applications on a device, a required version of an application, configuration states that may rely on various settings, etc. The specific settings included in a profile may typically be set by a service manager such as an MDM, and may include an embedded certificate that the OS will recognize and install for the device, such as in a "trust store" or "certificate store" or other suitable memory space (any of which may be generically herein as a "trust store" for ease of reference) of the device. Typically, the profile is formatted in a manner such that the particular OS is able to recognize and implement the settings defined therein when installed by a user. For example, a profile may be an XML file that contains settings (which may define or otherwise indicate desired parameters) to deploy to the OS of a client device. The profile may therefore set and/or control a variety of device settings, functions and the like, e.g. passcode policies, email account configurations, calendar, contact accounts, VPN settings, WiFi settings, restrictions on how and what features and components of the device can and cannot be used, etc. If the profile is uninstalled, disabled, becomes corrupted or is otherwise inactive, the OS will typically remove the corresponding certificate from its trust store.

Disclosed are various embodiments for a system and associated devices and methods for controlling access to resources such as computer applications and electronic data. In one embodiment, a client device executes an application on a user device based on a confirmation that a required profile is present on the user device. As described further herein, the profile may typically include parameters that relate to disabling one or more functions of the client device, such that client device's ability to further distribute the data accessed by the application is inhibited. The confirmation may be based on the presence of a unique certificate associated with the required profile, and typically present on the client device. However, it should also be understood that, as "cloud-based" applications continue to develop, aspects of the invention may find applicability in profile and certificate management environments that securely associate particular client devices with profiles and certificates, without necessarily storing the profiles or corresponding certificates locally on the client device itself.

FIG. 1 illustrates a networked environment 100 according to various embodiments. The networked environment 100 includes a network 110, a client device 120, and a distribution server 150. The network 110 may be or include, for example, any type of wireless network such as a wireless local area network (WLAN), a wireless wide area network (wWAN), or any other type of wireless network now known or later developed. Additionally, the network 110 may be or include the Internet, intranets, extranets, microwave networks, satellite communications, cellular systems, PCS, infrared communications, global area networks, or other suitable networks, etc., or any combination of two or more such networks. In one embodiment, the network 110 facilitates transmission of resources 165 between one or more client devices 120 and a distribution server 150.

The client device 120 may be a desktop computer, a laptop computer, a personal digital assistant, a cellular telephone, a set-top box, a music player, a web pad, a tablet computer system, a game console, and/or another device with like capability. The client device 120 may include a wired network connectivity component (not shown in FIG. 1), for example, an Ethernet network adapter, a modem, and/or the like. The client device 120 may further include a wireless network connectivity interface (not shown in FIG. 1), for example, a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like. The client device 120 may thus be operable to communicate via wired connection with the distribution server 150 with the aid of the wired network connectivity component. The client device 120 may be further operable to communicate wirelessly with the distribution server 150 with the aid of the wireless network connectivity component. Additionally, the client device 120 may further comprise a memory for storing data and applications, a processor for executing applications stored in memory, and a local interface such as a bus.

Additionally, the client device 120 may store in a data store 122 a profile 123, user credentials 132, a certificate 135, and other data. In one embodiment, profile 123, may indicate one or more required configuration parameters related to capabilities, functions, and/or applications of the client device 120 that must either be present or not present, or enabled or disabled, on the client device 120 in order to open an application 126 stored on the client device 120 or use that application 126 to access certain data stored on the client device 120, and/or to access certain resources 165 available on the distribution server 150.

For example, the required profile 123 may indicate that a camera, screen capture function, or other function (including applications or functions performed by applications) that would facilitate the transfer of data outside of the client device 120 must be not present, or disabled. These parameters may be determined by a service provider that supports application 126 and/or that manages distribution service 174. Therefore, parameters included in the profile 123 may be advantageously used to limit the ability of the client device 120 to transfer certain data outside of the client device 120. Additional details regarding the installation and function of the profile 123 are described further below.

The user credentials 132 may uniquely identify the user of the client device 120. For example, the user credentials 132 may include a username, a password, and/or biometric data related to facial recognition, retina recognition, fingerprint recognition, and the like.

The certificate 135 may represent either, or both, of an algorithm for generating a unique certificate and/or the generated certificate itself. In some embodiments, the certificate 135 is introduced to the client device 120 via the profile 123, For example, in certain operating systems, the system may recognize that a profile 123 includes a root or intermediate certificate, and automatically store the certificate in a trust store, or certificate store. The certificate 135 may be unique and associated with the client device 120, application 126, and/or the profile 123. For example, the certificate 135 may be based on one or more of a unique hardware identifier such as a GUID (Globally Unique Identifier), UUID (Universally Unique Identifier), UDID (Unique Device Identifier), serial number, IMEI (Internationally Mobile Equipment Identity), Wi-Fi MAC (Media Access Control) address, Bluetooth MAC address, a CPU ID, and/or the like, or any combination of two or more such hardware identifiers. Additionally or alternatively, the certificate 135 may be securely tied to the profile 123 such that, if the profile 123 is disabled on the client device 120, then the certificate 135 is removed or uninstalled from the client device's trust store.

The certificate 135 may be generated and/or updated by the client device 120, or may be provided by a third party. For example, an application running on the client device 120 can generate a certificate 135 in coordination with a third party server, and can thereafter use the certificate for validation on the client device 120.

The client device 120 may further be configured to execute various applications. For example, the client device 120 may be configured to execute applications such as web browsing applications, email applications, instant messaging applications, and/or other applications capable of receiving and/or rendering resources 165 on a display 136 associated with the client device 120. Any applications capable of receiving and/or rendering resources on a display 136 is generally referred to herein as a "client side application" 126, even though some, or all, of the application program itself may reside on non-transitory storage medium of any device or server networked to the client device 120. According to certain aspects of the invention, a client side application 126 may further include instructions that identify a required certificate 135 associated with the required profile 123.

Figure 2:
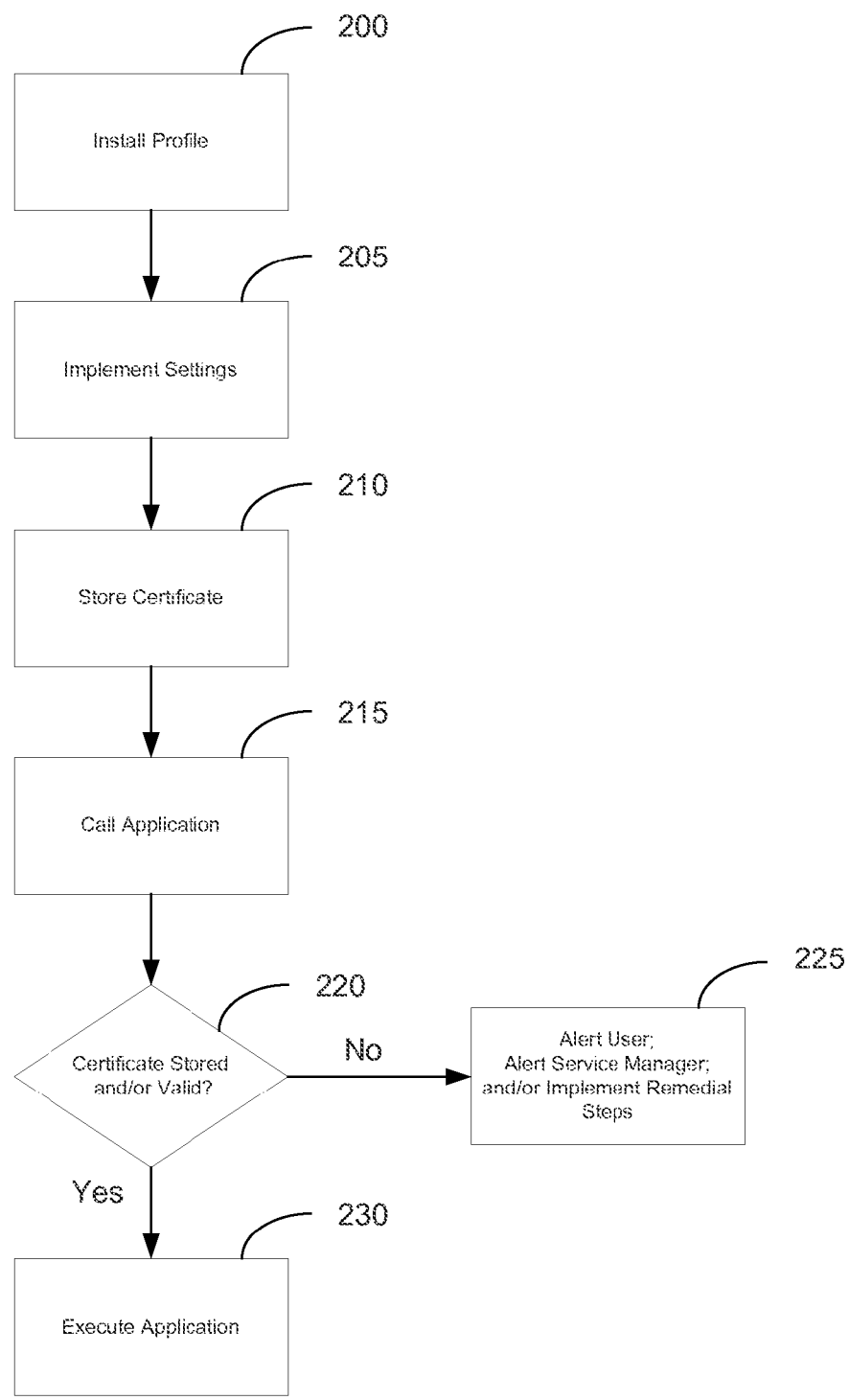
FIG. 2 is a flowchart illustrating an exemplary application access control process using profile and certificate confirmation in the networked environment of FIG. 1 according to certain embodiments of the present invention.

For example, a set of instructions may be included in the client side application 126 that are executed when the application is called. This set of instructions may include a certificate identifier(s) associated with one or more required profiles for the application, and code for querying the OS if the identified certificate(s) are installed. The required profile, and more specifically the device parameters that must be implemented to execute the application, may be set by a service provider that provides the application, provides additional code for the application to perform the certificate validation, and/or provides the profile to the user. Thus, the set of instructions included in the client side application 126 may cause the application to communicate with the OS, using the certificate identifier to determine if the required certificate is installed on the client device 120, FIG. 2 is a flowchart illustrating an exemplary application access control process using profile and certificate confirmation in the networked environment of FIG. 1 according to certain embodiments of the present invention. As shown in FIG. 2, the method may begin with step 200, in which a profile is installed on a client device such as client device 120 from FIG. 1. The profile may typically be installed, for example, by opening the profile the embedded in or attached to an e-mail, connecting a smartphone or other mobile client device to a PC (e.g., via USB or another suitable connector, or via Bluetooth, WiFi, infrared or other suitable wireless connection) and loading the profile to the mobile client device. It should be understood that the need to "manually" install such profiles onto the client device is driven by the fact that the client device is not managed, or at least not fully managed, by an MDM and therefore the profile and other MDM settings cannot be "pushed" to the client device by the MDM. Exemplary profiles may include, for example, an iOS profile, an Android OS profile, a Windows Mobile profile, a Windows Phone profile, a Windows 8 (etc.) profile, a Mac OS X (etc.) profile, a Symbian OS profile, or similar profiles recognized by other OS's. In some embodiments, the profile may be associated with (and perhaps specially configured for) a certain user and/or client device or a class or users or client devices. As such, the distribution server 150, or other profile provider, can associate a unique profile with a unique device or set of devices, and ensure that the profile is not migrated to any other device(s). By way of example, a profile with more restrictive device configuration requirement may be provided for devices used by users with lower security clearance or lesser administrative privileges, etc. and a profile with less restrictive device configuration requirements may be provided for devices used by users with higher security clearance or greater administrative privileges, etc.

As part of the profile installation, and as shown in step 205, the client device may automatically implement one or more parameters included in the profile. As discussed above, such parameters may advantageously include inhibiting certain hardware and/or software functions of the client device such as a camera, a screen capture, an artificial intelligence and/or assistance program (e.g. Apple Siri, Google Now, and the like), a GPS, Wifi communication, cellular communication, a microphone, speakers, a touchscreen, network support and/or services (e.g. Apple iCloud, Microsoft SkyDrive and the like), etc. In certain embodiments consistent with current OS standards, one ore more of the foregoing parameters may be applied globally (i.e. system wide and applying to all applications). However, the invention may also find applicability in systems that allow for discreet application of such parameters, e.g. limiting camera operation or other functions of the client device only when certain applications are executed, or certain data is rendered on the display screen, etc.

In certain embodiments, such parameters may be applied in a hierarchical manner whereby the most restrictive parameters from a plurality of installed profiles are implemented, which ensures that the client device continues to comply with all required parameters. For example, if a first profile is installed that prohibits all screen capture, the later installation of a profile that only limits screen capture while certain applications are running will not override the more restrictive first profile, at least with respect to the global prohibition of screen capture. Therefore, hi some embodiments, multiple profiles may be provided to and simultaneously installed on a particular client device, or the client device or user of the client device may be permitted to choose among the different profiles to be installed in different circumstances.

The method may continue with step 210, in which the system identifies any certificate associated with the profile, and stores the certificate. In some embodiments, the certificate is included in the profile and extracted therefrom by the OS. In other embodiments, the certificate may be provided separately from the profile. Typically the storage is implemented in a trust store that resides on the client device to ensure uninterrupted access to the trust store. However, it may also be possible to store the certificate on another networked device or server that is securely associated with the client device for future reference. The certificate may be, for example, a root or intermediate certificate.

The method may continue with step 215, in which an application, or other resource, is called. This may include, for example, a user request to execute an application or access a file, an application calling another application or resource, etc. In certain embodiments, the request may initiate a limited execution or access to the requested resource in order to execute instructions that attempt to identify a required profile or certificate and/or complete a required certificate validation.

The method may continue with step 220, in which the system checks to see if the required certificate is installed on the device. It should be understood that, as used herein, checks to see if the required certificate is "installed" on the device may include one or more of checking to see if the certificate is stored on the device, checking to see if the certificate is stored in a particular location on the device, e.g. in a trust store, and/or checking to see if a certificate stored on the device is valid. This may be done, for example, by the called application including instructions that request the OS to confirm whether a required certificate is "trusted" by the device. In some embodiments, certificates stored remotely, and associated with the device, may be subject to similar checks, and in some instances may be used in step 220 instead of checking for certificates stored on the device itself. In such embodiments, the remotely stored certificates may be updated, at various times, to ensure that the device includes the required profile as needed. For example, an application on the client device may send an alert to delete the remote certificate if the profile is removed, a remote server may ping the client device to check profile compliance, and take appropriate remedial action, such as deleting the remote certificate, if non-compliance is determined, etc.

In some embodiments, an identifier, or other sufficient indicia, of the required certificate may be encoded in the called application. In such embodiments, the application may be updated, as needed, to identify the appropriate certificate, e.g. based on profile updates, software version changes, etc. In some embodiments, the called application may be configured to fetch a required certificate, certificate identifier, or the like, from a remote resource or service provider, such as distribution service 174. For example, the called application may include instructions with an address, or other pointer, to a location at which required certificate, certificate identifier, or the like, are stored. A service provider, or other entity, may then update certificates, certificate identifiers, or the like, in a hardcoded location where various devices can fetch the new certificate, even if it changes.

In some embodiments, the called application may be configured to query the OS to determine whether the certificate is valid by presenting the certificate, or other sufficient indicia, to the OS and asking it to return a binary response of whether the certificate is trusted. The OS may, for example, refer to the trust store, or other certificate directory, to determine whether the certificate is present and/or has been signed by a certificate authority. Typically, current OS's are configured such that a particular application does not have direct access to the trust store in order to make such a determination on its own.

In response to the request from the application, the OS may look for the required certificate in the trust store and/or validate the certificate. In some embodiments, if the required certificate is found, the certification is determined to be trusted by the device and the method may proceed with step 230 where the application is allowed to complete the process of opening. In some embodiments, the certificate may be validated by other means as well, such as checking a certificate authority signature, before proceeding with step 230.

However, if the user has disabled or uninstalled the required profile, or the required profile has become corrupted, etc., then the corresponding certificate may have been removed from the trust store by the OS. Therefore, when the OS looks for the required certificate in the trust store, it will not be found, and the application will not be opened, Le the application will not execute its routines for opening or will otherwise be shut down. As mentioned above, certificates may also be determined to be invalid, for example, by not including a required signature, etc. In the event that the certificate is not "trusted" by the device, or is otherwise invalid, the method may continue with step 225.

In step 225, a number of options are possible. Generally speaking, step 225 may ensure that the request for access is denied, at least temporarily, until the problem with the certificate is resolved. This may involve, for example, the client device 120 suspending communication with the distribution server 150, the client device displaying an alert to the user with, or without, instructions for correcting the problem, the client device sending an alert to the distribution server, the distribution server suspending communication with the client device, the distribution server sending an alert to the client device, with, or without, instructions for correcting the problem, etc.

In some embodiments, the client device 120 and/or distribution server 150 may initiate corrective and/or remedial measures as part of step 225, such as on the client device 120. For example, the user of client device 120 may agree to certain restrictions or remedial measures when the profile 123 is installed, that go into effect if a certificate validation check fails. Such measures may include deleting any local resources that were originally accessed using the certificate 135, disabling enterprise resources 165 such as certain enterprise applications associated with the profile 123, etc. In certain embodiments, step 225 may be used to pursue an alternate access validation in the event that there is a connection between the user device and the distribution service 174 and the profile-based validation fails. For example, the distribution service 174 may initially attempt to validate the access request using the profile validation, which may require little to no user involvement, and, if that is not successful, the distribution service 174 may initiate a user credential/device identifier (or other) access validation.

In step 225 an alert may be sent to the user and/or service manager. The alert may include one or more of an identification of the application that did not open or the resource to which access was denied, the certificate that was not found, the profile parameters for the profile corresponding to the missing certificate, user identification, device identification, or other information.

It should be noted that, although only a single certificate validation step 220 is depicted in the embodiment of FIG. 2, as sequentially happening in a certain order, the invention is not limited to such sequential operation. For example, the certificate validation can be performed hi response to an attempt to open an application, an attempt to access data, at random times, according to a schedule, and/or based on detection of a non-complying parameter. Depending on the service provider's preferences, this may allow the application to execute based on previous certificate validations, e.g. within a predetermined time frame, or may require updated certificate checks, even while the application is running.

Figure 3:
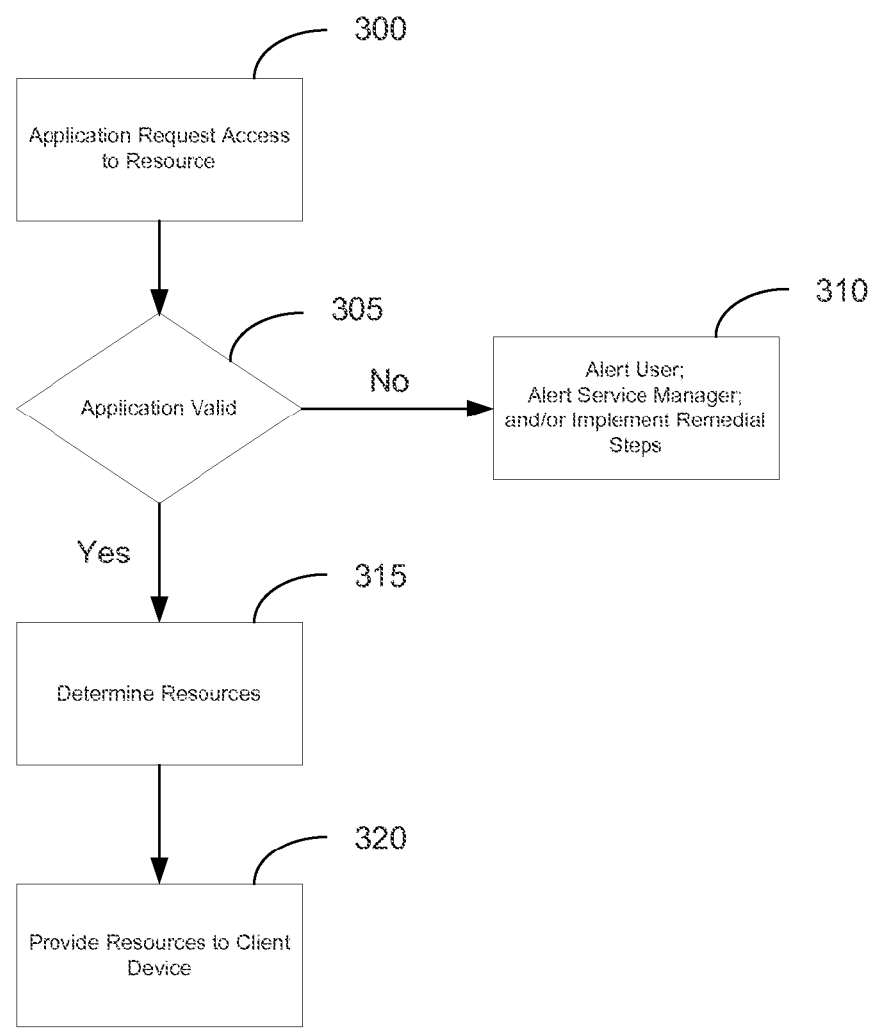
FIG. 3 is a flowchart illustrating an exemplary data access control process using profile and certificate confirmation executed in the networked environment of FIG. according to certain embodiments of the present invention.

FIG. 3 is a flowchart illustrating an exemplary data access control process using profile and certificate confirmation executed in the networked environment of FIG. 1 according to certain embodiments of the present invention. The steps shown FIG. 3 may be performed after, or independent of, the steps shown in FIG. 2. In step 300, a client side application, such as application 126 shown in FIG. 1, requests access to resources which may be stored locally on the device, or remotely on a server, such as distribution server 150 shown in FIG. 1. For example, with respect to a request for remotely stored resources, a client side application 126 may be executed to transmit requests to access resources 165 to the distribution server 150 and render a user interface 137 on the display 136 that provides access to the resources 165. In particular, the resources 165 may be presented in a user interface 137 by decompressing compressed files and presenting the uncompressed files, mounting disk image files and presenting the mounted image files, running executable files and presenting the executed files, by enabling a data search of the resources 165 and presenting the featured output in a user interface, by calling on another application on the client device 120 to respond to data links contained within the resources 165, and/or by transmitting a part or the whole of the resources 165 to another application on the client device 120.

In step 305, a determination is made as to whether the requesting application complies with the necessary criteria to access the requested resource. Step 305 may include, for example, checks to ensure that an application has been updated to a current version, that the request includes valid user credentials, that the request is not coming from a blacklisted address, etc. in some embodiments, a certificate check, as described above, may be all that is implemented in order to grant the application general access to a group of local or remote resources. However, the invention may also be applied in environments that require various other access controls in addition to, or as alternatives to, the certificate validation, as discussed further below.

If the requesting application is found not to comply with any of the requirements to access the requested resource, the method may continue with step 310. In step 310, a number of options are possible. Generally speaking, step 310 may ensure that the request for access is denied, at least temporarily, until the problem with the requesting application is resolved. In situations where the client device is attempting to access resources on the distribution server, this may involve, for example, the distribution server suspending communication with the client device, the distribution server sending an alert to the client device, with, or without, instructions for correcting the problem, etc.

In some embodiments, the client device 120 and/or distribution server 150 may initiate corrective and/or remedial measures as part of step 310, such as those described above with respect to step 225.

If the requesting application is found to comply with the requirements to access the requested resource, the method may continue with step 315. In step 315, the resources that correspond to the request, and to which access is authorized, are determined. In some embodiments, parts, or all, of step 315 may optionally be performed prior to step 305.

Various ways of identifying resources that are subject to a particular request, and that may be implemented in conjunction with the concepts provided herein. For example, further details regarding methods of determining the accessible resources, in the context of the present invention, are discussed with reference back to FIG. 1. As shown in FIG. 1, in one embodiment, the resource qualifier 172 may be or include metadata that describes and/or regulates the use of the respective resource 165. For example, a resource qualifier may include categories/sub-categories to which the resource 165 belongs, an indication that the resource 165 is considered a favorite, an indication of whether the resource 165 is privately owned, publicly owned, and/or enterprise-owned, an indication of whether the resource 165 is confidential, an indication of whether the resource 165 is password protected, an indication of the historical version of the resource 165, a description of the resource 165, one or more comments regarding the resource 165, an indication of the size and format of the resource 165, an indication of the download priority associated with the resource 165, an indication of the expiration date associated with the resource 165, an indication of the effective date associated with the resource 165, an indication of the ownership of the resource 165, an indication of the managing party of the resource 165, and/or the like, or any combination of resource qualifiers.

The distribution server 150 may comprise, for example, a server computer or any other system providing distribution capability. For purposes of convenience, the distribution server 150 is referred to herein in the singular. Even though the distribution server 150 is referred to in the singular, it is understood that a plurality of distribution servers 150 may be employed in the arrangements as descried herein.

Certain applications and/or other functionality may be executed in the distribution server 150 according to certain embodiments. Also, certain data is stored in a data store 153 that is accessible to the distribution server 150. The data stored in the data store 153, for example, is associated with the operation of the applications and/or functional entities described herein.

The data store 153 may include resource grouping identifiers 154, resources 165, and/or other data. In one embodiment, the resources 165 referenced herein may include any electronic data, such as databases, applications, text files, word processor files, spreadsheet files, presentation files, graphic files, audio files, photographic files, video files, applications and application files, and/or the like. More specifically, resources 165 may include: data files, audio files, video files, three-dimensional image files, raster image files, vector image files, page layout files, spreadsheet files, database files, executable files, CAD files, web files, plug-in files, font files, system files, settings files, encoded files, compressed files, disk image files, developer files, backup files, and/or any other files.

The resource grouping identifiers 154 may represent unique identifiers for previously determined resource groupings and are used to determine which resources 165 are served up to the user of the client device 120, For example, a resource grouping may relate to approved profile and certificates 159, organizational groups, organizational roles, geographic locations, and/or any other type of grouping that require access to a type of resource. In some embodiments, distribution rules 171 may specify, or be otherwise associated with, required profiles 125 or certificates 135 that must be confirmed in order to transfer resources to a requesting client device 120.

Each resource grouping identifier 154 may be associated with a pairing of at least one of a plurality of approved user credentials and device identifiers 156 and/or a pairing of at least one of a plurality of approved profiles and certificates 159. Generally speaking, pairings of approved user credentials and device identifiers 156 may be used to manage the distribution of resources 165 to managed client devices 120, whereas pairings of approved profiles and certificates 159 can be used to manage distribution of resources 165 to unmanaged client devices 120.

The components executed on the distribution server 150, for example, include the distribution service 174 and other applications, services, processes, systems, engines, or functionality not disclosed in detail herein. The distribution service 174 may be executed to provide resources 165 stored in the data store 153 to a requesting client device 120 based on, for example, resource grouping identifiers 154 and distribution rules 171, as will be described. Distribution service 174 may also generate and distribute required profiles 123 including certificates 135 to client devices. It should be understood that, in some circumstances it may be advantageous to push the distribution rules 171 to managed client devices that do not use a profile and certificate validation as described herein. However, if a client device is using a profile and certificate validation, the distribution rules 171 may simply be used as a tool to associate approved profiles and certificates with appropriate resources, without pushing the distribution rules 171 to the client device(s).

A user operating a client device 120 may wish to access resources 165 stored on the distribution server 150. In one embodiment, the user may interact with an input device to manipulate a user interface 137 rendered by the client side application 126, to thereby cause the client device 120 to transmit a request 177 for accessing one or more resources 165 on the distribution server 150, For unmanaged devices, the client device 120 and/or the distribution server 150 may be required to confirm the installation of the certificate 135 on the device 120 before access will be granted. For example, the request 177 may include confirmation that the client device 120 has a valid certificate 135, or it may include such information as may be necessary for distribution server 150 to confirm these facts.

Upon determining that the request 177 from the client device 120 is valid, such as in step 305 of FIG. 3, the distribution server 150 may further determine which of the resources 165 to provide to the client device 120, as in step 315 of FIG. 3. In one embodiment, the distribution service 174 determines which resources 165 to provide based on the resource grouping identifiers 154 associated with each resource 165. For instance, in the case of a managed client device 120, the distribution service 174 may first determine which resource grouping identifiers 154 are associated with user credentials 132 included in the request 177. In the case of an unmanaged client device, the distribution service 174 may first determine which resource grouping identifiers 154 are associated with the profile/certificate information received from the client device 120.

Next, the distribution service 174 may identify a resource 165 to provide to the client device 120 based on the determined resource grouping identifiers 154. In one embodiment, the distribution service 174 identifies one or more resources 165 associated with each one of the determined resource grouping identifiers 154. In another embodiment, the distribution service 174 identifies the resource 165 if the resource 165 is associated with all of the determined resource grouping identifiers 154. Additionally, in another embodiment, the distribution service 174 identifies the resource 165 if it is associated with a threshold number of the resource grouping identifiers 154. The distribution service 174 may then provide the identified resources 165 to the client device 120 or otherwise allow the client device to access such resources 165.

In step 315, information related to the access request may also be logged and stored, for example, by the client device 120 and/or distribution server 150. These records may be used to maintain access for predetermined periods of time and other housekeeping matters, such as refusing further access requests after a certain number of faded attempts.

In step 320, the distribution service 174 facilitates accessing the resources 165 for the client device 120. In one embodiment, the requested resource(s) may be provided to client side application 126 based on the request and validation without further input from the user, e.g. the distribution service 174 automatically transmits the identified resources 165 that the client device 120 is authorized to receive. In other embodiments, the distribution service 174 may provide an operable hyperlink, or the like, to the client device 120, that is tied to a specific client side application. For instance, the client device 120 may receive an indication that the resource 165 is available for download and may transmit a request to the distribution service 174 for downloading the applicable resource 165. Upon receiving the request, the distribution service 165 may transmit the resource 165 to the client device 120. A client side application 126 on the client device 120 may periodically determine whether the client device 120 remains compliant to access the received resources 165, e.g. based on periodic certificate validation, as described above.

Other access facilitating methods may include, for example, granting folder access, application downloads and/or access, etc. For example, the distribution service 174 may provide an appropriate user interface to the client device 120. The distribution service 174 may determine the resource grouping identifiers 154 of the resources 165 accessible using the profile 123 from the client device 120. In one embodiment, the distribution service 174 determines the resource grouping identifiers 154 based on the required certificate. For instance, each resource grouping identifier 154 may be associated with a profile/certificate. The distribution service 174 may determine one or more resource grouping identifiers 154 associated with the profile certificate, as described above.

Aspects of the above described steps may also be performed with respect to accessing resources stored locally on the client device. For example, an application that uses a certificate validation may be allowed to store certain data locally. If a user attempts to reopen the locally stored data, the application may go through certificate validation steps before granting access to the locally stored data. Likewise, the data store 122 may include any of the resource grouping identifiers 154, and the like, as used on the distribution server 150, to facilitate identification of accessible resources that may be stored on the client device 120.

Although the distribution service 174, client side application 126, and other various systems described herein may be embodied hi software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 may show certain functionality and operations described as performed by the distribution service 174 and client side application 126, respectively. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more steps may be scrambled relative to the order shown. Also, two or more blocks shown in succession in FIGS. 2 and 3 may be executed concurrently or with partial concurrence. Further, in some embodiments, one or more of the steps shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Any logic or application described herein, including the distribution service 174 and the client side application 126, or other processes and modules running on distribution server 150 or client device 120, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system, hi the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method comprising:
    receiving, at a device from a remote server, a profile and a certificate that is unique to the profile, the profile specifying mandatory settings for the device, wherein installation of the profile by the device causes the certificate to be accessible by the device;
    sending, by the device, a request to perform at least one of utilizing a resource and executing an application; and
    receiving, at the device, authorization to perform the at least one of utilizing a resource and executing an application, wherein the authorization is based on:
        a determination that the certificate is accessible by the device; and
        a determination that the device is compliant with the specified mandatory settings.

2. The method of claim 1, wherein the determination that the certificate is accessible by the device includes determining whether the certificate is stored on the device.

3. The method of claim 1, wherein the determination that the certificate is accessible by the device includes determining whether the certificate is stored remotely from the device and associated with the device.

4. The method of claim 1, wherein one of the mandatory settings includes the device having an embedded certificate installed, the embedded certificate being included in the in the profile.

5. The method of claim 1, wherein the authorization is further based on verifying that the certificate is valid.

6. The method of claim 1, wherein the request includes a request by the device to execute the application to utilize the resource.

7. The method of claim 1, wherein the request further includes a request to provide the application with access to a plurality of additional resources authorized by the certificate in order to provide the application with access to the resource.

8. A non-transitory, computer-readable medium comprising instructions that, when executed by a processor of a device, performs stages comprising:
    receiving, at a device from a remote server, a profile and a certificate that is unique to the profile, the profile specifying mandatory settings for the device, wherein installation of the profile by the device causes the certificate to be accessible by the device;

sending, by the device, a request to perform at least one of utilizing a resource and executing an application; and receiving, at the device, authorization to perform the at least one of utilizing a resource and executing an application, wherein the authorization is based on:
  a determination that the certificate is accessible by the device; and
  a determination that the device is compliant with the specified mandatory settings.

9. The non-transitory, computer-readable medium of claim 8, wherein the determination that the certificate is accessible by the device includes determining whether the certificate is stored on the device.

10. The non-transitory, computer-readable medium of claim 8, wherein the determination that the certificate is accessible by the device includes determining whether the certificate is stored remotely from the device and associated with the device.

11. The non-transitory, computer-readable medium of claim 8, wherein one of the mandatory settings includes the device having an embedded certificate installed, the embedded certificate being included in the in the profile.

12. The non-transitory, computer-readable medium of claim 8, wherein the authorization is further based on verifying that the certificate is valid.

13. The non-transitory, computer-readable medium of claim 8, wherein the request includes a request by the device to execute the application to utilize the resource.

14. The non-transitory, computer-readable medium of claim 8, wherein the request further includes a request to provide the application with access to a plurality of additional resources authorized by the certificate in order to provide the application with access to the resource.

15. A device, comprising:
a memory storage including a non-transitory, computer-readable medium comprising instructions; and
at least one processor that executes the instructions to carry out stages comprising:
  receiving, at a device from a remote server, a profile and a certificate that is unique to the profile, the profile specifying mandatory settings for the device, wherein installation of the profile by the device causes the certificate to be accessible by the device;
  sending, by the device, a request to perform at least one of utilizing a resource and executing an application; and
  receiving, at the device, authorization to perform the at least one of utilizing a resource and executing an application, wherein the authorization is based on:
    a determination that the certificate is accessible by the device; and
    a determination that the device is compliant with the specified mandatory settings.

16. The device of claim 15, wherein the determination that the certificate is accessible by the device includes determining whether the certificate is stored on the device.

17. The device of claim 15, wherein the determination that the certificate is accessible by the device includes determining whether the certificate is stored remotely from the device and associated with the device.

18. The device of claim 15, wherein one of the mandatory settings includes the device having an embedded certificate installed, the embedded certificate being included in the in the profile.

19. The device of claim 15, wherein the authorization is further based on verifying that the certificate is valid.

20. The device of claim 15, wherein the request includes a request by the device to execute the application to utilize the resource.

* * * * *